United States Patent [19]

Bates

[11] Patent Number: 5,490,655
[45] Date of Patent: Feb. 13, 1996

[54] VIDEO/DATA PROJECTOR AND MONITOR CEILING/WALL MOUNT

[75] Inventor: Nigel P. Bates, Napa, Calif.

[73] Assignee: Monger Mounts, Inc., Napa, Calif.

[21] Appl. No.: 122,757

[22] Filed: Sep. 16, 1993

[51] Int. Cl.[6] .................................................. A47H 1/10
[52] U.S. Cl. ......................... 248/329; 248/332; 248/324
[58] Field of Search ............................. 248/161, 157, 248/186, 329, 415, 917, 919, 922, 324, 326, 333, 332, 331; 52/710, 167.3; 254/337

[56] References Cited

U.S. PATENT DOCUMENTS

| | | |
|---|---|---|
| 2,006,300 | 6/1935 | Kinninger . |
| 2,053,226 | 9/1936 | Ruge .................................. 52/167.3 X |
| 3,661,415 | 5/1972 | Piasecki ................................ 254/337 |
| 3,774,873 | 11/1973 | Krogsrud ............................... 248/280 |
| 3,981,340 | 9/1976 | Anderson et al. .................... 150/52 R |
| 4,310,136 | 1/1982 | Mooney ................................ 248/278 |
| 4,836,478 | 6/1989 | Sweere ................................. 248/1 E |
| 4,964,606 | 10/1990 | Beam et al. .......................... 248/333 |
| 5,139,223 | 8/1992 | Sedighzadeh ......................... 248/334 |
| 5,255,884 | 10/1993 | O'Neill ................................. 248/329 |

FOREIGN PATENT DOCUMENTS

| | | | |
|---|---|---|---|
| 203571 | 8/1989 | Japan ................................. 52/167 CB |
| 764 | 12/1863 | United Kingdom .................. 248/329 |

OTHER PUBLICATIONS

Unistrut General Engineering Catalog No. 11, Dec. 1988, pp. 2 & 8.

Primary Examiner—Leslie A. Braun
Assistant Examiner—Cathenne S. Collins
Attorney, Agent, or Firm—Limbach & Limbach; George C. Limbach

[57] ABSTRACT

A mount than secures a projector or monitor to a ceiling or wall is disclosed. The mount uses struts that form channels which support the projector/monitor and provide alternate channels for video and AC cabling to reduce interference. The mount may include a hook connector such that the projector or monitor can easily be detached from the ceiling or wall for installation and repair. An optional winch may be used to lower and raise the projector/monitor. Seismic cables may be added for extra support in case of earthquake.

6 Claims, 7 Drawing Sheets

VIDEO/DATA PROJECTOR AND MONITOR CEILING/WALL MOUNT

FIELD OF THE INVENTION

This invention relates to the video and data display field, specifically the mounting of video and data projectors and monitors to the ceiling or wall.

BACKGROUND OF THE INVENTION

Video and data projectors have been available for many years. They have evolved yielding better and brighter pictures. The method of mounting these projectors and monitors to the ceiling or wall during an on-site installation, however, has not changed significantly since their introduction.

Most video and data projectors and monitors are installed using a ceiling mount apparatus that secures the units to the ceiling, or alternately a wall mount apparatus that secures the units to a wall. The projectors and monitors are usually positioned below the ceiling at a position and angle that is optimal for viewing. The common mounting method uses a 2" metal water pipe with a flange screwed onto each end. The top flange is used to affix the mounting structure to the ceiling or wall. The bottom flange attaches to the projector or monitor. The length of the pipe dictates the "drop" (how low from the ceiling the projector or monitor hangs) for ceiling mounts. The pipe length alternately dictates the distance from the wall the projector/monitor is positioned for wall mounts. For best results, each mounting structure is custom assembled on-site so as to secure each projector/monitor with the proper drop and orientation for that particular installation site.

There are many drawbacks in a water pipe mounting structure assembled in this manner. First, very few installers carry pipe cutting and threading machines on their installation vehicles due to the enormous cost. Therefore, the custom assembly process is very time consuming. The installer must travel to the installation site and measure the desired "drop" and orientation for the projector/monitor. The installer must then travel to a company that stocks, cuts, and threads 2" water pipe per the custom specifications, and return with the pre-cut and pre-threaded water pipe to complete the installation procedure.

A second common problem is caused by using pipe threads to connect the pipe to the flanges. Cutting threads into the pipe ends weakens the pipe by thinning it at that location. Stress on the joints of the assembled mounting structure caused by side to side movement can break the pipe near the joints.

A third problem arises in that the threads are cut at an angle that is not 90 degrees. The installer must "shim" the projector/monitor with washers to bring it back to level.

A fourth problem is that pipe mounts cannot be easily adjusted. Water pipe mounts cannot pivot or rotate because the only joint, the threaded pipe end, cannot be loosened and still rigidly hold the projector/monitor in place.

The final problem with water pipe mounting structures is the access of the video and AC power cables. If the top of the pipe is accessible, the cables can be run down the center of the pipe to hide them from view. The video cables must then be shielded, however, because power cables in the same pipe with unshielded video cables will cause interference with the video signal. Additionally, for applications where the top of the pipe is not accessible, the cables must be run down the outside of the pipe, giving the installation an unfinished look.

There is a need for a mounting structure for projectors and monitors such that custom installations do not require threaded water pipe mounting structures or entail expensive time consuming assembly procedures. Further, there is a need for a mounting structure that rotates and adjusts side to side, pivots and adjusts up and down, and adjusts forwards and backwards for proper projector/monitor alignment.

SUMMARY OF THE INVENTION

Accordingly, several objects and advantages of the invention are as follows. All mount parts are constructed from cold rolled steel for strength. Struts forming channels are used instead of a single pipe. The AC power cables can be run separate from the video cables to increase the clarity of the video signal.

Snap on covers are fitted to the strut portion extending below the ceiling. The covers hide the cables and finish off the installation.

The struts connect to a ceiling or wall adapter on one side and a projector/monitor adapter on the other with bolts. No threaded joints are used. The advantages of threadless strut joints are many. First, by not using threaded junctions, the strength of the mount at the joints is increased because the thickness of the strut is not reduced. During an earthquake, this mount will bend where pipe joints would beak. Secondly, an installer need not carry expensive pipe threading equipment or leave the installation site to thread the pipe. The installer can easily cut the strut to the proper length on site with a hack saw and install the strut. Lastly, the ceiling/wall mount squarely attaches to the projector/monitor at 90 degrees. Therefore, "shims" used with pipe mounting structures are not required to level the projector/monitor with this new ceiling/wall mount.

The ceiling or wall mounts include pivot and rotate connections at crucial junctions. Therefore, the mounts can pivot up and down and rotate right or left for accurate projector/monitor orientation.

The mount can also include a seismic bracing kit. The seismic bracing kit includes cables that run from the ceiling to the strut so as to support the projector/monitor by triangulation. The seismic bracing kit allows larger and heavier projectors/monitors to be suspended farther down from a ceiling by limiting side to side movement of the shaft.

Further objects and advantages of this invention will become apparent from a consideration of the drawings and ensuing description.

DETAILED DESCRIPTION OF THE PREFERRED EMBODIMENT

Figure 1:
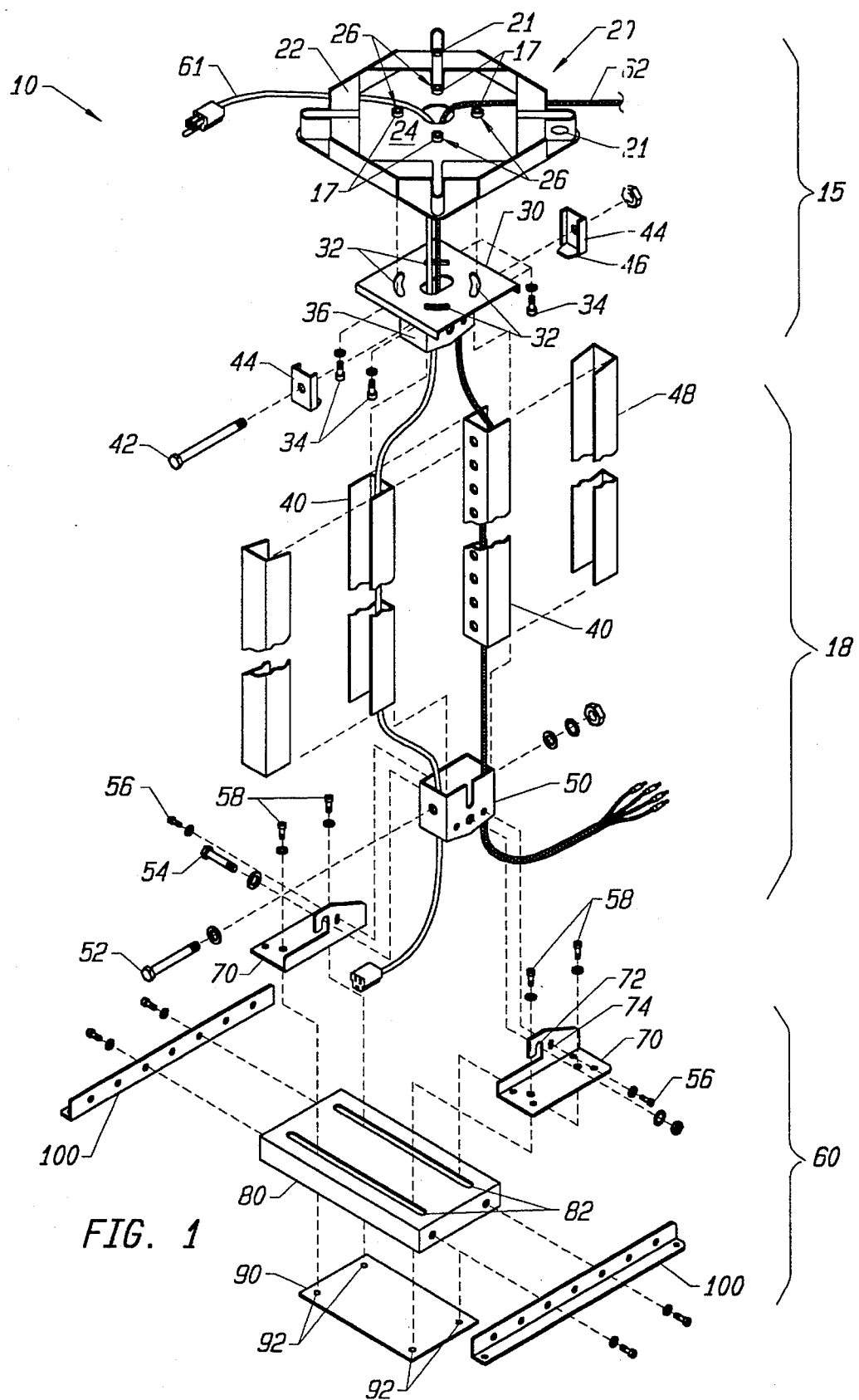
FIG. 1 is an exploded perspective view of a ceiling mount.

There are two preferred embodiments: the ceiling mount and the wall mount. The ceiling mount 10 is shown in FIG. 1. The ceiling mount 10 is comprised of three basic assemblies: the ceiling adapter assembly 15, the strut assembly 18, and the projector/monitor adapter assembly 60.

The ceiling adapter assembly 15 includes a base plate 20 constructed with a raised facia 22 and a lower mounting surface 24 that contains strut attachment means 17, such as four circularly spaced apertures to receive four bolts 34. PEM nuts 26 align over the attachment means 17 and with slots 32 in an upper rotation bracket 30 having a downwardly depending collar 36. When bolts 34 are loosened, slots 32 allow the bracket 30 to rotate relative to the base plate 20. To lock the position of the bracket 30, bolts 34 are simply tightened.

The outward faces of the raised facia 22 abut a ceiling mounting surface as the base plate 20 attaches to the ceiling. The base plate 20 is secured to the ceiling mounting surface by ceiling attachment means 21, such as four circularly spaced apertures to receive four bolts that engage the ceiling mounting surface.

The strut assembly 18 includes a pair of struts 40, such as slotted 12 gauge channels, channel covers 48, and a lower post bracket 50. The struts 40 are inserted into the collar 36 of the bracket 30. Struts 40 are secured to bracket 30 by a hex head bolt 42 and two tapered "L" brackets 44 having tapered tongues 46. When the bolt 42 is tightened, the tapered tongues 46 are forced into the channels of the struts 40 and spread the sides of the struts 40 against the inside of the collar 36 making a very firm mounting.

The lower post bracket 50 is attached over the lower end of the struts 40 with a hex head course through bolt and nut 52. The struts 40 can be cut to any length such that the lower post bracket 50 is positioned approximately where the top surface of the projector or monitor is to be located. The lower post bracket will support the projector adaptor assembly 60 by a hex head through bolt 54.

Channel covers 48 snap over the channels in struts 40 to conceal video and A.C. cables 61 and 62 which run on the inside of the channels. The A.C. cables 61 are located in one channel of struts 40 and the video cables 62 are in the other, which eliminates any bleed and signal interference.

The projector/monitor adapter assembly 60 includes two hook brackets 70, a side to side adjustment plate 80, a lower side to side support plate 90, and two L-shaped projector supports 100.

The two L-shaped projector supports 100 are bolted to the sides of the adjustment plate 80. A projector or monitor is attached to the two L-shaped projector supports 100. The adjustment plate 80 has two slots 82 which allow the side to side position of the projector/monitor to vary. The support plate 90 has four PEM nuts 92 that align with the slots 82. The two hook brackets 70, the side to side adjustment plate 80, and the support plate 90 are bolted together with four hex head through bolts 58.

The hook brackets 70 make for easy insertion of the projector adapter assembly 60 onto the lower post through bolt 54. During a site installation, the ceiling adapter assembly 15 is attached to the ceiling and the strut assembly 18 is attached to the ceiling adapter assembly 15. Then the projector/monitor adapter assembly 60 is attached to the projector or monitor. Finally, the projector adapter assembly 60, along with the attached projector/monitor, is lifted into place whereby the hook portion 72 of the hook bracket 70 will engage the through bolt 54. At this point, the ceiling adapter assembly 15 fully supports the projector/monitor adapter assembly 60 (and therefore the projector/monitor).

Once the projector/monitor adaptor section 60 is mounted on through bolt 54, the tilt angle is fixed by tilting the projector/monitor into the proper position and tightening the through bolt 54. The tilt angle is further secured by inserting two bolts 56 through the tilt slots 74 in the hook brackets 70.

Figure 2:
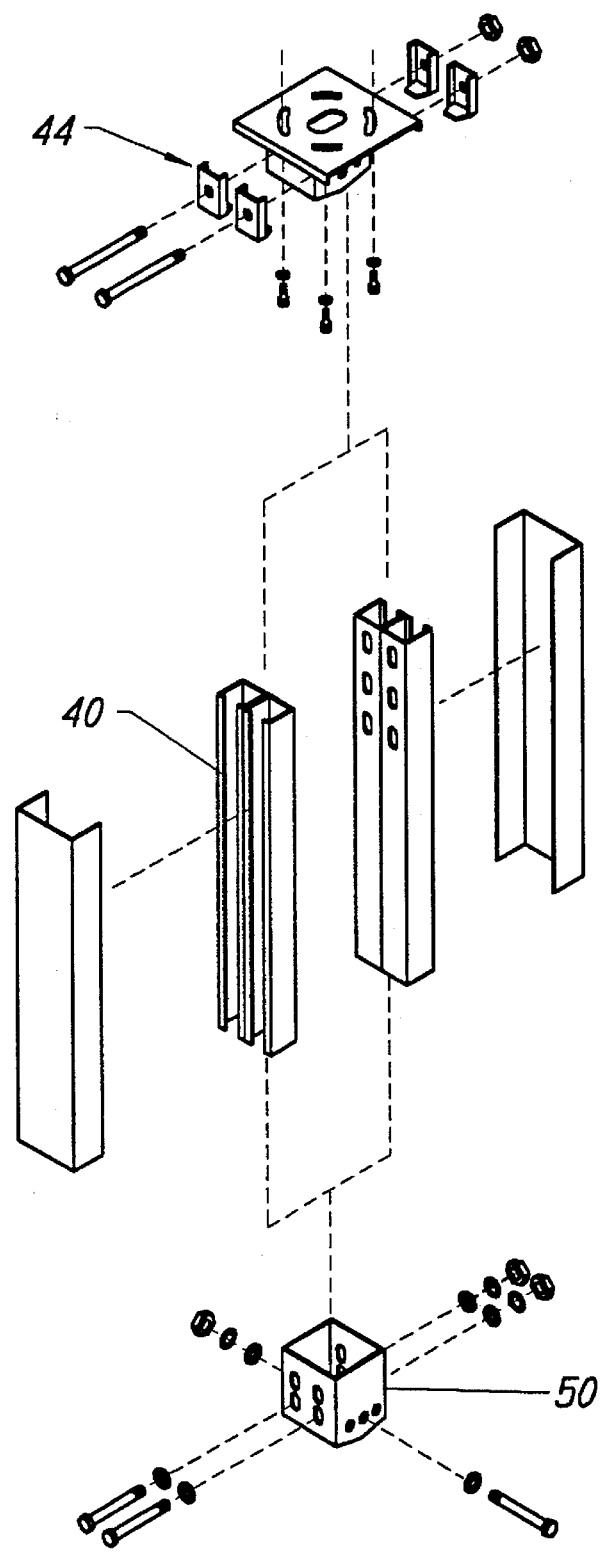
FIG. 2 is an exploded partial view of a ceiling mount with a 4 strut vertical support configuration.

A four strut embodiment shown in FIG. 2 is identical to the two strut embodiment in FIG. 1 except there are four struts 40 back to back and side to side. This configuration forms a substantial square mounting post which can handle larger pay loads.

Figure 3:
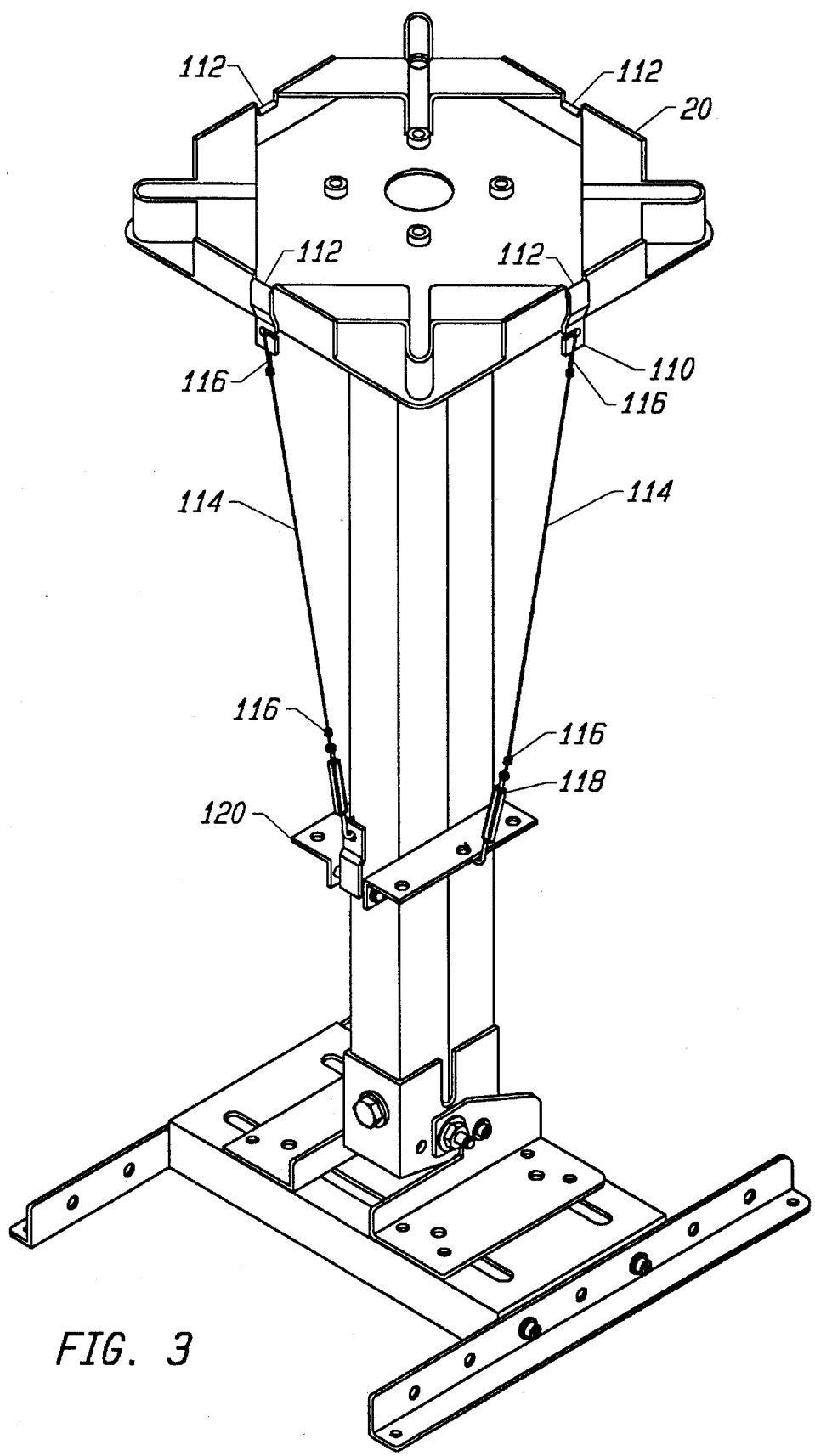
FIG. 3 is a perspective view of a ceiling mount with seismic bracing.

For large pay loads, a seismic bracing kit as shown in the embodiment in FIG. 3 can be added to stabilize the mounting structure in case of earthquake etc. A seismic bracing hook 110 attaches to indentations 112 on the upper edge of the base plate 20. Several aircraft type cables 114 with eyes 116 on each end attach to hooks 110 on one end and to turn buckles 118 on the other end. The turn buckles 118 hook through holes in seismic brackets 120 that are attached to the struts 40. The seismic bracing kit prevents the projector/monitor mounting assembly, and therefore the projector/monitor, from moving side to side in case of earthquake etc. The increased structural integrity is achieved by triangulating the struts 40 like the mast of ship.

Figure 4:
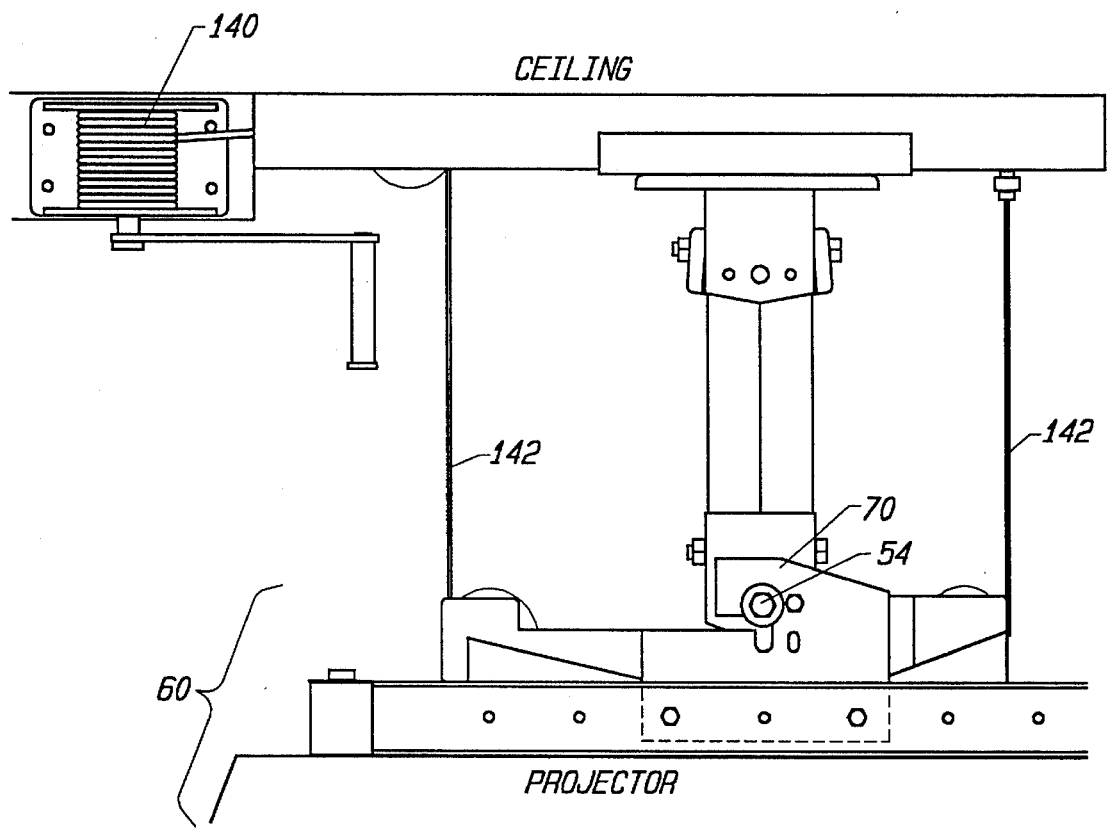
FIG. 4 is a perspective view of a ceiling mount with a projector/monitor adapter in the form of a detachable tray.

A winch 140 with winch cable 142, as shown in FIG. 4, can be used to lift the projector/monitor adapter 60 into place and engage the hook connector bracket 70 with the through bolt 54. The winch 140 is mounted on the ceiling where the winch cable 142 extends from the winch 140 to the projector/monitor assembly 60 where it is attached. Releasing the winch cable 142 from the winch 140 lowers the projector/monitor for installation and repair.

Figure 5:
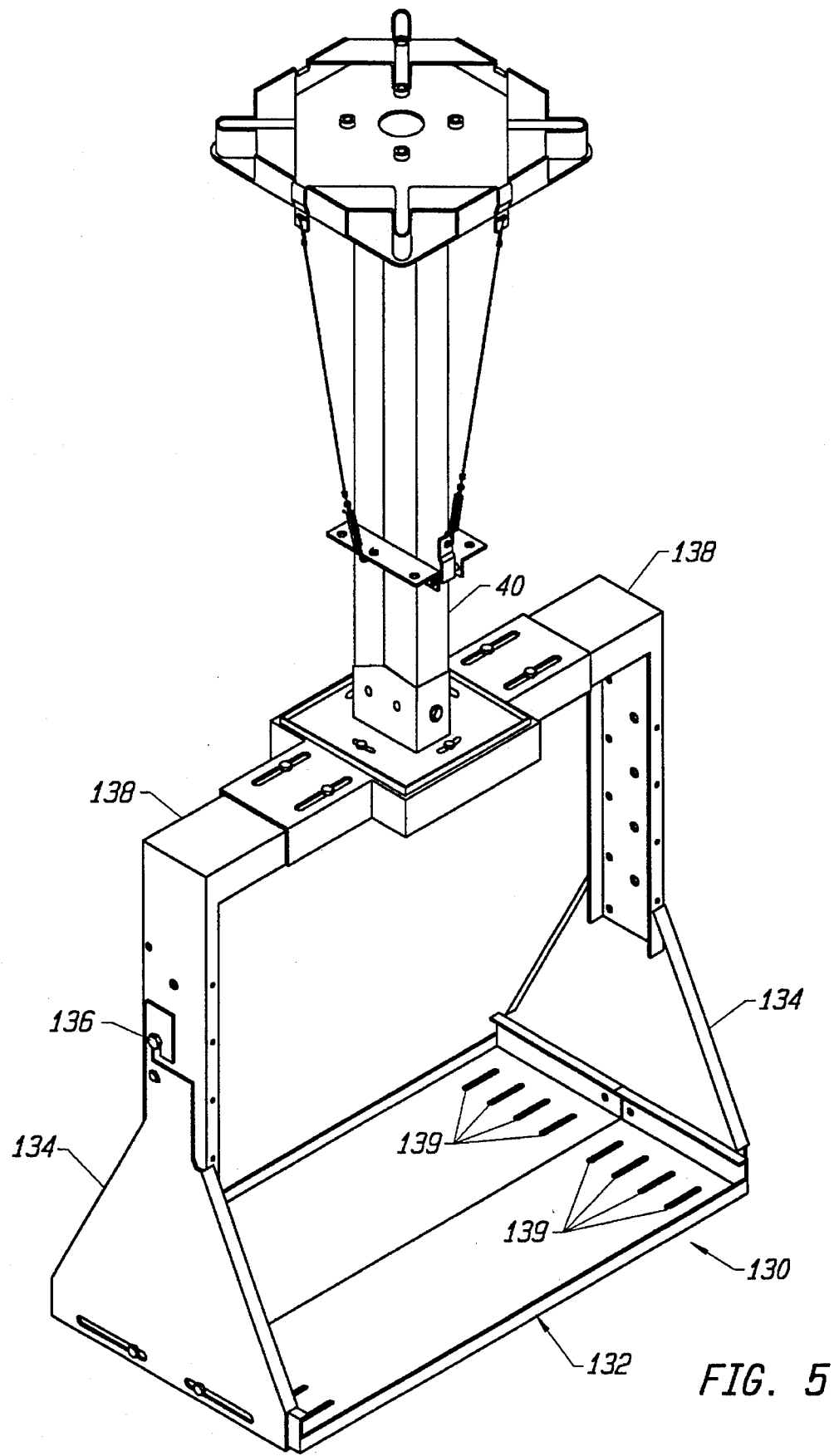
FIG. 5 is a side view of a ceiling mount with a winch and winch cable/used to raise and lower the projector/monitor.

An alternate embodiment of the ceiling mount is shown in FIG. 5. The projector/monitor adapter assembly 130 is in the form of a supporting tray 132 with sidewalls 134. Each of the sidewalls has a hook connector 136 that engages a projector/monitor adapter attachment means 138 which slidably attaches to the struts 40. The supporting tray 132 also has projector monitor attachment means 139, such as bolt holes, to secure a projector/monitor resting thereon.

Figure 6:
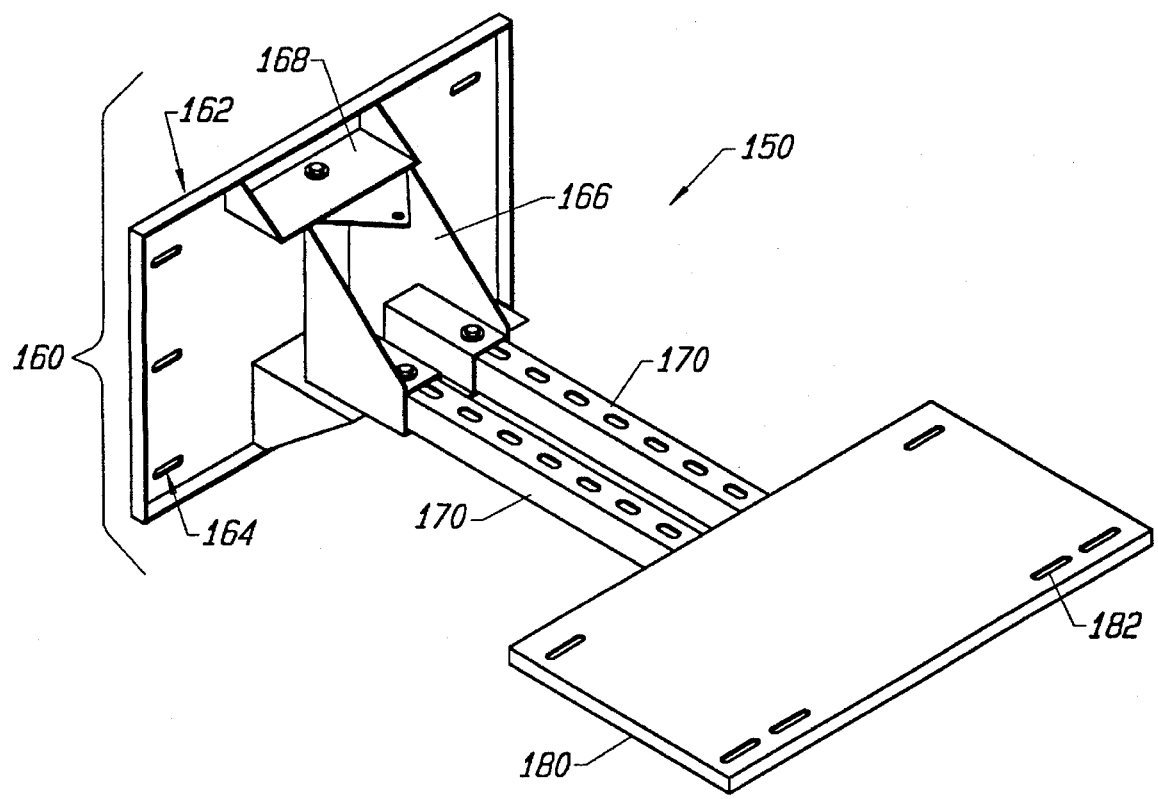
FIG. 6 is a perspective view of a wall mount having a fixed projector/monitor adapter.

The wall mount 150 is the second preferred embodiment, as shown in FIG. 6. The wall mount 150 is comprised of three basic assemblies: the wall support assembly 160, the struts 170 and the projector/monitor adapter 180.

The wall support assembly includes a wall plate 162 with wall attachment means 164, such as six spaced apertures to receive bolts entering the wall. A strut adapter 166 is rotatably attached to the wall plate 162 by a bolt attached between two wall adapter plates 168.

Two struts 170 attach to the strut adapter 166. A projector/monitor adapter 180 attaches to the other end of struts 170 to support a projector or monitor placed thereon. Projector/monitor attachment means 182, such as bolt holes, are formed in the projector/monitor adapter to secure a projector/monitor resting thereon.

Figure 7:
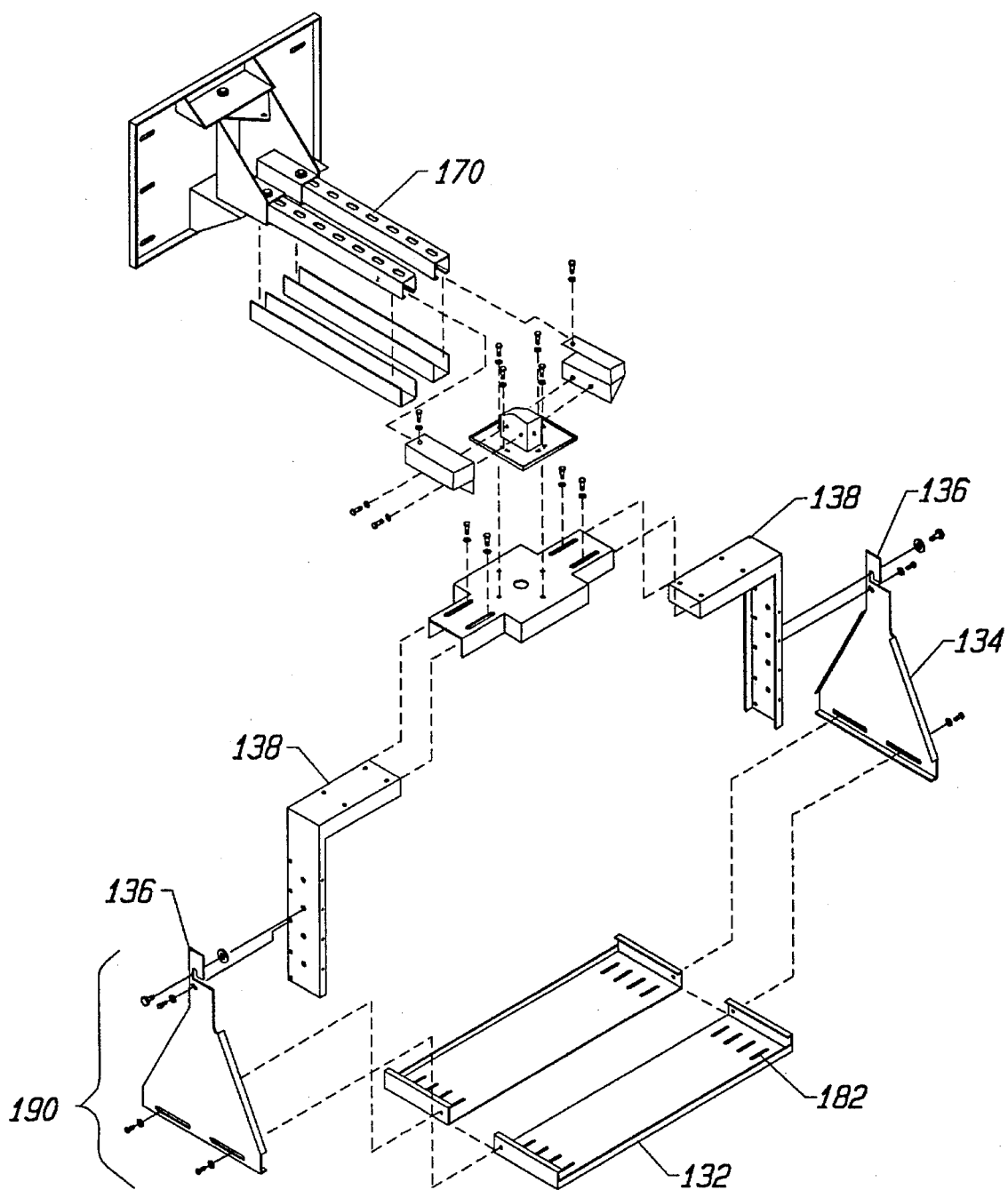
FIG. 7 is an exploded perspective view of a wall mount with a projector/monitor adapter in the form of a detachable tray.

An alternate embodiment of the wall mount is shown in FIG. 7. The projector/monitor adapter assembly 190 is the same as that shown in FIG. 4. The supporting tray 132 has sidewalls 134. Each of the sidewalls 134 has a hook connector 136 that engages a projector/monitor adapter attachment means 138 which slidably attaches to the struts 170. The supporting tray 132 has projector/monitor attachment means 182, such as bolt holes, to secure a projector/monitor resting thereon.

It is to be understood that the present invention is not limited to the embodiments described above and illustrated herein, but encompasses any and all variations falling within the scope of the appended claims.

What is claimed is:

1. An audiovisual projector/monitor ceiling/wall mount comprising:

a ceiling/wall adapter assembly having a means for attaching to a ceiling/wall;

a strut formed by a plurality of U-shaped channels having at least one of the mounting relationships of back to back and side by side, said strut having a first and a second end, said U-shaped channels providing a first channel and a second channel separate from the first channel to run different types of cabling;

said ceiling/wall adapter assembly including locking rotational adjustment means for rotatably supporting the first end of the strut and for adjusting and locking the rotation of the strut at multiple strut rotational positions;

a projector/monitor adapter assembly having a means for supporting a projector/monitor;

a hook and bolt connector having a hook and a bolt, the hook and bolt connector attached to the second end of the strut and the projector/monitor adapter assembly whereby the strut and the projector/monitor adapter assembly are demountably attached by the hook engaging the bolt, the hook and bolt connector securing the projector/monitor adapter assembly relative to a horizontal plane;

means for slidably attaching the projector/monitor adapter assembly to the strut;

a cable with a first and a second end, the first end connected to the ceiling/wall adapter assembly and the second end connected to the strut; and a channel cover attached to the channel of the strut to form a conduit inside the channel.

2. An audiovisual projector/monitor ceiling/wall mount as recited in claim 1 further comprising:

a tapered L-bracket dimensioned for insertion into the channel of the strut for connecting the strut to the ceiling/wall adapter wherein such insertion causes spreading of the channel of said U-shaped strut.

3. An audiovisual projector/monitor ceiling/wall mount as recited in claim 1 further comprising:

a winch having a winch cable, the winch cable extending from the winch and attached to the projector/monitor adaptor assembly whereby the projector/monitor adaptor assembly is raised and lowered for connection with the strut.

4. An audiovisual projector/monitor ceiling/wall mount as recited in claim 3 further comprising:

at least two pulleys attached to the projector/monitor adapter assembly wherein the winch cable loops through the pulleys, the end of the winch cable being attached to the ceiling/wall adapter assembly.

5. An audiovisual projector/monitor ceiling/wall mount, comprising:

a ceiling/wall adapter assembly having a means for attaching to a ceiling/wall;

a strut formed by a U-shaped channel that depends from the ceiling/wall adapter assembly having a proximal end and a distal end whereby the proximal end is rotatably supported by the ceiling/wall adapter assembly with means for adjusting and locking the rotation of the strut at multiple strut rotational positions;

a projector/monitor adapter assembly attached to the distal end of the strut, the projector/monitor adapter having a means for supporting a projector/monitor;

the projector/monitor adapter assembly including a hook connector that attaches the projector/monitor adapter assembly to the distal end of the strut, the hook connector securing the projector/monitor adapter assembly relative to a horizontal plane; and a tapered L-bracket dimensioned for insertion into and spreading of the channel of the strut for connecting the strut to the ceiling/wall adapter.

6. An audiovisual projector/monitor ceiling/wall mount comprising:

a ceiling/wall adapter assembly having a means for attaching to a ceiling/wall;

a strut formed by at least two U-shaped channels having at least one of the mounting relationships of back to back and side by side, said strut having a first and a second end, said U-shaped channels providing a first channel and a second channel separate from the first channel to run different types of cabling;

said ceiling/wall adapter assembly including locking rotational adjustment means for rotatably supporting the first end of the strut and for adjusting and locking the rotation of the strut at multiple strut rotational positions;

a tapered L-bracket dimensioned for insertion into the channel of the strut for connecting the strut to the ceiling/wall adapter wherein such insertion causes spreading of the channel of said U-shaped strut;

a projector/monitor adapter assembly having a means for supporting a projector/monitor, and having at least two pulleys attached thereto;

means for slidably attaching the projector/monitor adapter assembly to the strut;

a cable with a first and a second end, the first end connected to the ceiling/wall adapter assembly and the second end connected to the strut; and a winch with the distal end of a winch cable extending therefrom, the winch cable extending through the projector/monitor adapter assembly pulleys, the distal end of the cable attached to the ceiling wall adapter.

* * * * *